(12) United States Patent
Ganiger et al.

(10) Patent No.: US 11,761,631 B2
(45) Date of Patent: Sep. 19, 2023

(54) INTEGRAL DOME-DEFLECTOR MEMBER FOR A DOME OF A COMBUSTOR

(71) Applicant: General Electric Company, Schenectady, NY (US)

(72) Inventors: Ravindra Shankar Ganiger, Bengaluru (IN); Hiranya Nath, Bengaluru (IN); Sripathi Mohan, Bengaluru (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/806,576

(22) Filed: Jun. 13, 2022

(65) Prior Publication Data

US 2023/0258336 A1 Aug. 17, 2023

(30) Foreign Application Priority Data

Feb. 15, 2022 (IN) .............................. 202211007899

(51) Int. Cl.
 *F23R 3/00* (2006.01)
 *F23R 3/50* (2006.01)

(52) U.S. Cl.
 CPC .............. *F23R 3/002* (2013.01); *F23R 3/007* (2013.01); *F23R 3/50* (2013.01); *F23R 2900/00017* (2013.01); *F23R 2900/03043* (2013.01)

(58) Field of Classification Search
 CPC .. F23R 3/002; F23R 3/007; F23R 3/50; F23R 2900/00017; F23R 2900/03041; F23R 2900/03043; F23R 2900/03044
 See application file for complete search history.

(56) References Cited

U.S. PATENT DOCUMENTS

| 4,004,056 | A | | 1/1977 | Carroll | |
|---|---|---|---|---|---|
| 4,380,896 | A | | 4/1983 | Wiebe | |
| 5,623,827 | A | * | 4/1997 | Monty | F23R 3/10 60/804 |
| 5,799,491 | A | * | 9/1998 | Bell | F23R 3/10 60/754 |
| 6,298,667 | B1 | * | 10/2001 | Glynn | F23R 3/002 60/737 |
| 3,033,114 | A1 | | 10/2011 | Hernandez et al. | |
| 10,598,382 | B2 | | 3/2020 | Tu et al. | |
| 10,663,168 | B2 | | 5/2020 | Xu | |
| 10,767,863 | B2 | | 9/2020 | Freeman et al. | |
| 10,801,730 | B2 | | 10/2020 | Kramer | |
| 11,015,812 | B2 | | 5/2021 | Petty, Sr. et al. | |

(Continued)

FOREIGN PATENT DOCUMENTS

| EP | 2995863 B1 | 5/2018 |
|---|---|---|
| EP | 3321586 B1 | 6/2021 |
| GB | 2432902 B | 6/2007 |

*Primary Examiner* — Scott J Walthour
(74) *Attorney, Agent, or Firm* — Venable LLP; Edward A. Kmett; Michele V. Frank (57) ABSTRACT

A dome structure for a combustor of a gas turbine includes a frame structure extending circumferentially about a combustor centerline axis, and a plurality of integrated dome-deflector plate members mounted to the frame structure. Each of the plurality of integrated dome-deflector plate members includes a dome wall, a deflector wall, and a plurality of side walls connecting the dome wall and the deflector wall to each other. A cavity is defined by the dome wall, the deflector wall, and the plurality of side walls.

20 Claims, 7 Drawing Sheets

(56) References Cited

U.S. PATENT DOCUMENTS

2008/0236164 A1* 10/2008 Bunel .................... F23R 3/10
    60/740
2016/0153658 A1* 6/2016 Xu ...................... F02C 7/24
    60/757
2016/0245518 A1 8/2016 Drake
2018/0363903 A1* 12/2018 Dziech ................ F23R 3/007

* cited by examiner

INTEGRAL DOME-DEFLECTOR MEMBER FOR A DOME OF A COMBUSTOR

CROSS REFERENCE TO RELATED APPLICATIONS

The present application claims the benefit of Indian Patent Application No. 202211007899, filed on Feb. 15, 2022, which is hereby incorporated by reference herein in its entirety.

TECHNICAL FIELD

The present disclosure relates to a dome structure for a combustor of a gas turbine engine. More particularly, the present disclosure relates to dome structure having a frame, and a plurality of integral dome-deflector members connected thereto to form the dome structure in a gas turbine engine.

BACKGROUND

Gas turbine engines are known to include a combustor that has a dome structure extending around the combustor. The dome structure generally provides separation between an air plenum upstream of the dome structure, and a combustion chamber downstream of the dome structure. A plurality of mixer assemblies are included in the combustor, and each mixer assembly extends through the dome structure to provide a fuel-air mixture into a combustion chamber adjacent to the dome structure. To provide protection from heat during combustion, a separate deflector may be provided on the combustion chamber side of the dome structure to protect the mixer assembly and the dome structure from the heat generated during combustion of the fuel-air mixture in the combustion chamber. The deflector is generally a metallic structure that may be coated with a high temperature coating to provide added protection from thermal breakdown of the deflector.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

DETAILED DESCRIPTION

Features, advantages, and embodiments of the present disclosure are set forth, or apparent from, a consideration of the following detailed description, drawings, and claims. Moreover, it is to be understood that the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Gas turbine engines are known to include a combustor having a dome structure extending around the combustor. The dome structure generally provides separation between an air plenum upstream of the dome structure, and a combustion chamber downstream of the dome structure. A plurality of mixer assemblies are generally provided in the combustor and each mixer assembly extends through the dome structure to provide a fuel-air mixture into a combustion chamber adjacent to the dome structure. A separate deflector is generally provided around the mixer assemblies to deflect heat from combustion away from the dome structure. The dome structure and the separate deflector are conventionally made of a metallic material. When exposed to the high heat of combustion, over time, the metallic deflector tends to breakdown and require replacement. Replacing the deflector is a costly and time-consuming process.

The present disclosure addresses the foregoing by providing a dome structure having a frame structure extending circumferentially about a combustor centerline axis, and a plurality of integrated dome-deflector members mounted to the frame structure. Each of the plurality of integrated dome-deflector members includes a dome wall, a deflector wall, and a plurality of side walls connecting the dome wall and the deflector wall to each other. A cavity is defined between the dome wall, the deflector wall and the plurality of side walls. Cooling passages are provided through the dome wall and the deflector wall so that cooling air can flow from the pressure plenum upstream of the dome wall into the cavity and, then, from the cavity to a combustion chamber side of the deflector wall. The integrated dome-deflector member can be mounted to the frame structure in any number of a variety of ways so as to readily be able to replace the dome-deflector member, if necessary.

Figure 1:
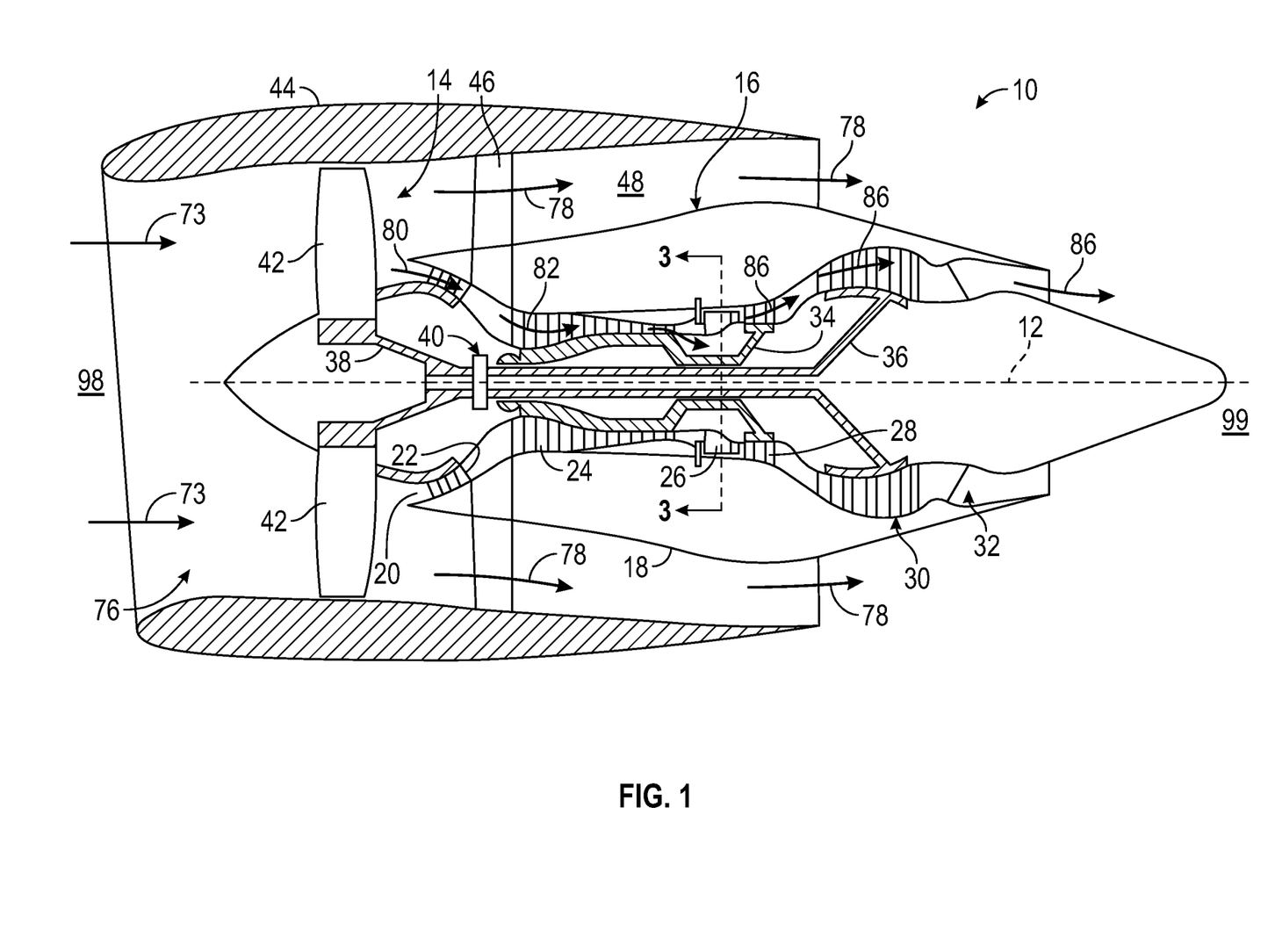
FIG. 1 is a schematic partial cross-sectional side view of an exemplary high by-pass turbofan jet engine, according to an aspect of the present disclosure.

Referring now to the drawings, FIG. 1 is a schematic partial cross-sectional side view of an exemplary high by-pass turbofan jet engine 10, herein referred to as "engine 10," as may incorporate various embodiments of the present disclosure. Although further described below with reference to a ducted turbofan engine, the present disclosure is also applicable to turbomachinery in general, including turbojet, turboprop, and turboshaft gas turbine engines, including marine and industrial turbine engines and auxiliary power units. In addition, the present disclosure is not limited to ducted fan type turbine engines, such as that shown in FIG. 1, but, can be implemented in unducted fan (UDF) type turbine engines. As shown in FIG. 1, engine 10 has an axial centerline axis 12 that extends therethrough from an upstream end 98 to a downstream end 99 for reference purposes. In general, engine 10 may include a fan assembly 14 and a core engine 16 disposed downstream from the fan assembly 14.

The core engine 16 may generally include an outer casing 18 that defines an annular inlet 20. The outer casing 18 encases, or at least partially forms, in serial flow relationship, a compressor section (22/24) having a low pressure (LP) compressor 22, a high pressure (HP) compressor 24, a combustor 26, a turbine section (28/30) including a high pressure (HP) turbine 28 and a low pressure (LP) turbine 30, and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 may be connected to the fan shaft 38 by way of a reduction gear 40, such as in an indirect-drive or a geared-drive configuration.

As shown in FIG. 1, the fan assembly 14 includes a plurality of fan blades 42 that are coupled to, and extend radially outwardly from, the fan shaft 38. An annular fan casing or nacelle 44 circumferentially surrounds the fan assembly 14 and/or at least a portion of the core engine 16. In one embodiment, the nacelle 44 may be supported relative to the core engine 16 by a plurality of circumferentially spaced outlet guide vanes or struts 46. Moreover, at least a portion of the nacelle 44 may extend over an outer portion of the core engine 16 so as to define a bypass airflow passage 48 therebetween.

Figure 2:
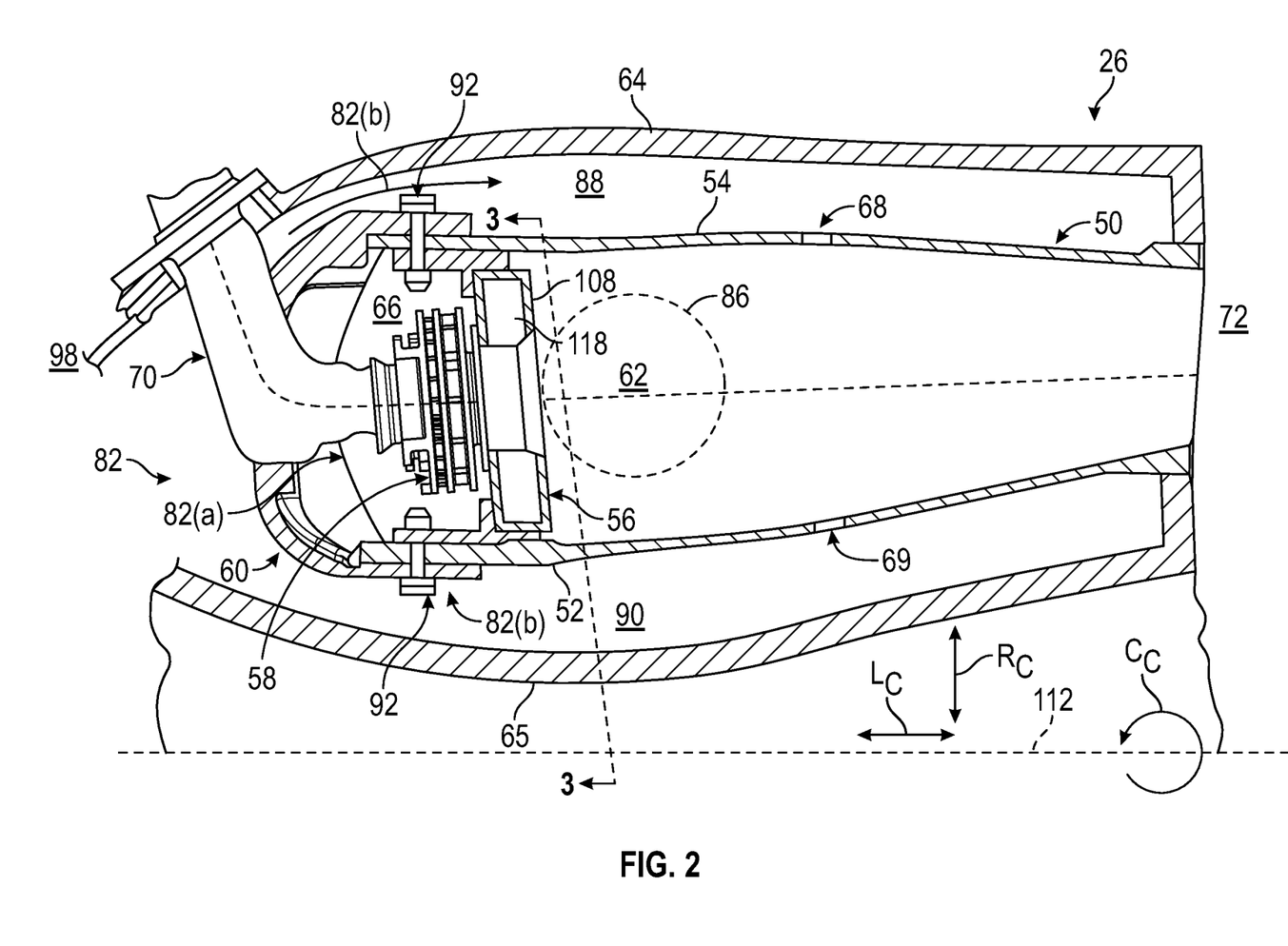
FIG. 2 is a partial cross-sectional side view of an exemplary combustor, according to an aspect of the present disclosure.

FIG. 2 is a cross-sectional side view of an exemplary combustor 26 of the core engine 16 as shown in FIG. 1. FIG. 2 depicts a combustor axial centerline 112 that may generally correspond to the engine axial centerline axis 12. Thus, the combustor 26 of FIG. 2 defines a combustor longitudinal direction ($L_C$) corresponding to the combustor axial centerline 112, a combustor radial direction ($R_C$) extending outward from the combustor axial centerline 112, and a combustor circumferential direction ($C_C$) extending circumferentially about the combustor axial centerline 112. As shown in FIG. 2, the combustor 26 may generally include a combustor liner 50, having an inner liner 52 and an outer liner 54, that are connected to a cowl 60. Each of the inner liner 52 and the outer liner 54 are annular liners that extend circumferentially about the combustor axial centerline 112. A dome structure 56 (to be described in more detail below) is connected to the cowl 60 and extends in the combustor radial direction $R_C$ between the inner liner 52 and the outer liner 54, and also extends circumferentially about the combustor axial centerline 112. Together, the inner liner 52, the outer liner 54, and the dome structure 56 define a combustion chamber 62 therebetween. In the combustion chamber 62, an initial chemical reaction of an ignited fuel-oxidizer mixture injected into the combustion chamber 62 by a swirler assembly 58 may occur to generate combustion gases 86. The combustion gases 86 then flow further downstream into the HP turbine 28 and the LP turbine 30 (FIG. 1) via a turbine nozzle 72 at a downstream end of the combustion chamber 62. While FIG. 2 depicts a single swirler assembly 58, a plurality of the swirler assemblies 58 are present in the combustor 26, where the respective swirler assemblies 58 are circumferentially spaced apart from one another about the combustor axial centerline 112.

The combustor 26 further includes an outer casing 64 that extends circumferentially about the combustor axial centerline 112, and an inner casing 65 that also extends circumferentially about the combustor axial centerline 112. An outer flow passage 88 is defined between the outer casing 64 and the outer liner 54, and an inner flow passage 90 is defined between the inner casing 65 and the inner liner 52. The outer liner 54 may also include a plurality of outer liner dilution openings 68 that are circumferentially spaced around the outer liner 54. Similarly, the inner liner 52 may include a plurality of inner liner dilution openings 69 that are circumferentially spaced around the inner liner 52.

Referring back to FIG. 1, in operation, air 73 enters the nacelle 44 at a nacelle inlet 76, and a portion of the air 73 enters the compressor section (22/24) as a compressor inlet air flow 80, where it is compressed to form compressed air 82. Another portion of the air 73 enters the bypass airflow passage 48, thereby providing a bypass airflow 78. In FIG. 2, the compressed air 82 from the compressor section (22/24) enters the combustor 26 via a diffuser (not shown). A portion of the compressed air 82(a) enters the cowl 60 into a pressure plenum 66 therewithin, while another portion of the compressed air 82(b) passes to the outer flow passage 88 and to the inner flow passage 90. The compressed air 82(a) in the pressure plenum 66 passes through the swirler assembly 58 to mix with fuel injected by a fuel nozzle assembly 70 to form the fuel-oxidizer mixture that is then ignited and burned in the combustion chamber 62 to generate the combustion gases 86. A portion of the compressed air 82(b)

in the outer flow passage 88 may be used as dilution air provided to the combustion chamber 62 through the plurality of outer liner dilution openings 68, and another portion of the compressed air 82(*b*) in the inner flow passage 90 may also be used as dilution air provided to the combustion chamber 62 through the plurality of inner liner dilution openings 69.

Figure 3:
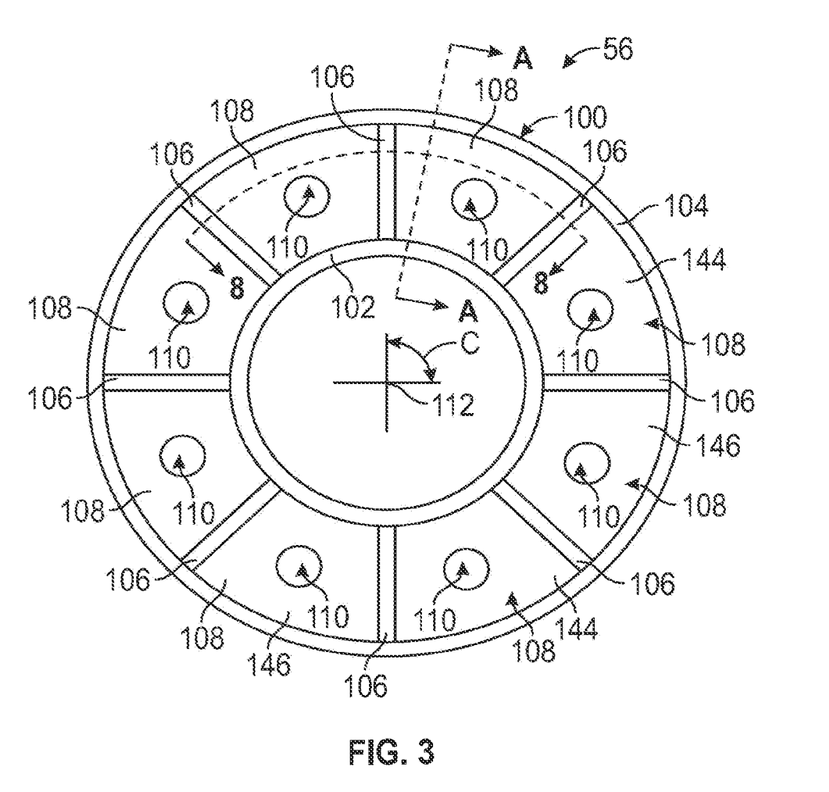
FIG. 3 is an aft forward-looking view, taken at plane 3-3 in FIG. 2, of a dome structure, according to an aspect of the present disclosure.

FIG. 3 depicts an aft forward-looking view of the dome structure 56, taken at plane 3-3 (FIGS. 1 and 2), according to an aspect of the present disclosure. The dome structure 56, as was mentioned above, extends circumferentially about the combustor axial centerline 112. As shown in FIG. 2, the dome structure 56 is suitably connected to the cowl 60, along with the outer liner 54 and the inner liner 52, via, for example, fasteners 92. Of course, other means of fastening the dome structure 56 to the cowl 60 may be implemented instead. Referring back to FIG. 3, the dome structure 56 is seen to include a frame structure 100 that extends circumferentially about the combustor axial centerline 112. The frame structure 100 includes an inner frame member 102 extending circumferentially about the combustor axial centerline 112, and an outer frame member 104 extending circumferentially about the combustor axial centerline 112. While FIG. 3 appears to show a single piece inner frame member 102 and a single piece outer frame member 104, the inner frame member 102 and/or the outer frame member 104 may be constructed of multiple sections that are joined together instead. The inner frame member 102 and the outer frame member 104 may be constructed of metallic materials, or may be constructed of composite materials, such as a ceramic matrix composite material, or any combination of metallic and composite materials. The outer frame member 104 is arranged radially outward of the inner frame member 102.

The frame structure 100 is further seen to include a plurality of rib members 106 that are circumferentially spaced apart about the combustor axial centerline 112. The plurality of rib members 106 connect to the inner frame member 102 and to the outer frame member 104. The rib members 106 may also be constructed of metallic materials or of composite materials and may be joined to the inner frame member 102 and the outer frame member 104 via any suitable connection, such as a bolted connection or a brazed/welded connection. As will be described below, however, in some aspects of the present disclosure, the plurality of rib members 106 may be omitted.

The dome structure 56 further includes a plurality of integrated dome-deflector members 108 that are mounted to the frame structure 100. As will be discussed in more detail below, each integrated dome-deflector member 108 is a hollow box-like structure formed by a dome wall, a deflector wall, side walls, and outer and inner walls that are all integrated together into a single member such that each integrated dome-deflector member 108 can be mounted individually to the frame structure 100. Various mounting techniques for mounting the integrated dome-deflector members 108 to the frame structure 100 will be described below. Each integrated dome-deflector member 108 includes a swirler assembly opening 110 therethrough. As shown in FIG. 2, the swirler assembly 58 extends through the integrated dome-deflector member 108 so as to be able inject the fuel-oxidizer mixture (not shown) into the combustion chamber 62. In FIG. 3, respective ones of the plurality of integrated dome-deflector members 108 are mounted in circumferential arrangement about the combustor axial centerline 112 between the inner frame member 102 and the outer frame member 104, and are arranged circumferentially between successive pairs of the plurality of rib members 106. However, as will be described below with regard to FIG. 9, when the rib members 106 are omitted as was mentioned above, the plurality of integrated dome-deflector members 108 may butt against one another instead and form a seal therebetween.

Figure 4:
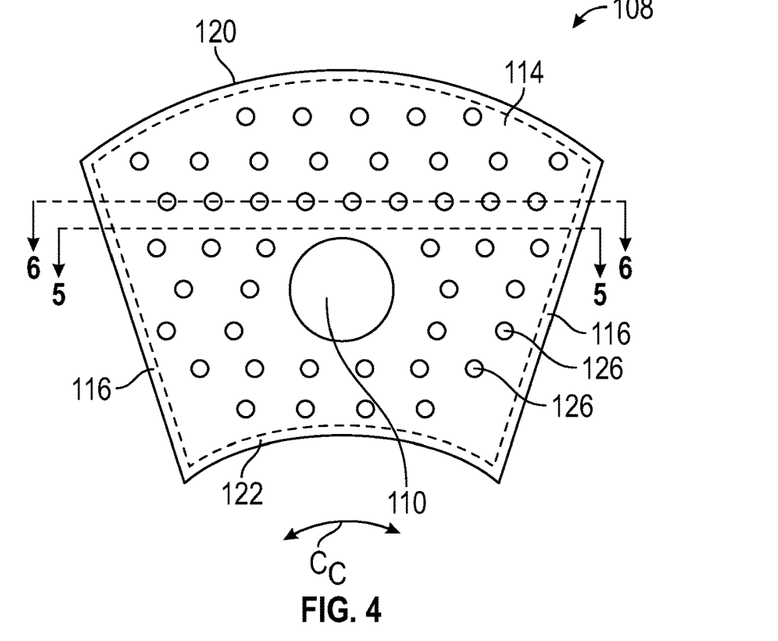
FIG. 4 is an enlarged forward-looking view of an integrated dome-deflector member, according to an aspect of the present disclosure.
Figure 5:
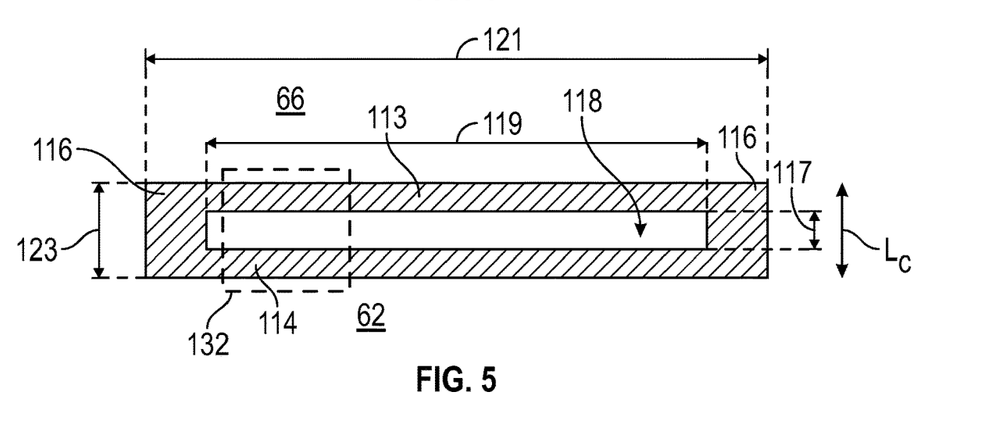
FIG. 5 is a cross-sectional view through an integrated dome-deflector member, taken at plane 5-5 in FIG. 4, according to an aspect of the present disclosure.
Figure 6:
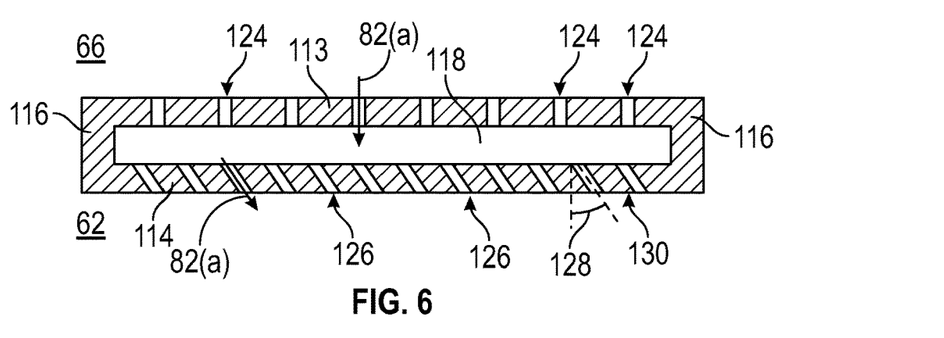
FIG. 6 is a cross-sectional view through an integrated dome-deflector member, taken at plane 6-6 in FIG. 4, according to an aspect of the present disclosure.

A more detailed description of the integrated dome-deflector member 108 shown in FIG. 3 will now be provided with regard to FIGS. 4 to 6. FIG. 4 is an enlarged forward looking view of an integrated dome-deflector member 108, according to an aspect of the present disclosure. FIG. 5 is a cross-sectional view taken at plane 5-5 in FIG. 4, and FIG. 6 is a cross-sectional view taken at plane 6-6 in FIG. 4. As shown in FIG. 5, the integrated dome-deflector member 108 includes a dome wall 113, a deflector wall 114, and a plurality of side walls 116 connecting the dome wall 113 and the deflector wall 114 to each other. A cavity 118 is defined between the dome wall 113, the deflector wall 114, and the plurality of side walls 116. The integrated dome-deflector member 108 may also include an outer wall 120 (shown with hidden lines in FIG. 4) and an inner wall 122 (also shown with hidden lines in FIG. 4), where the outer wall 120 and the inner wall 122 both extend circumferentially between the plurality of side walls 116 and also extend in the longitudinal direction (L) between the dome wall 113 and the deflector wall 114. Thus, each of the dome wall 113, the deflector wall 114, the plurality of side walls 116, the outer wall 120, and the inner wall 122 are integrated together such that the integrated dome-deflector member 108 is constructed to define a hollow box-like structure, with the cavity 118 therewithin. The integrated dome-deflector member 108 may be constructed of, for example, a metal alloy, a ceramic material, or a ceramic matrix composite (CMC) material, or any combination thereof.

In FIG. 6, the dome wall 113 is seen to include a plurality of dome wall cooling passages 124 therethrough. The dome wall cooling passages 124 are configured to provide a flow of the compressed air 82(*a*) from the pressure plenum 66 (FIG. 2) into the cavity 118. Similarly, the deflector wall 114 includes a plurality of deflector wall cooling passages 126 therethrough. The deflector wall cooling passages 126 are configured to provide a flow of compressed air 82(*a*) from the cavity 118 to a combustion chamber side 130 of the deflector wall 114. The deflector wall cooling passages 126 may be arranged at an angle 128 so as to induce a swirled flow of the compressed air 82(*a*) into the combustion chamber 62. The compressed air 82(*a*) injected into the combustion chamber 62 from the deflector wall cooling passages 126 provides, in part, a film cooling to the combustion chamber side 130 of the deflector wall 114. As seen in FIG. 4, the deflector wall cooling passages 126 are arranged about the swirler assembly opening 110. The number and the size of deflector wall cooling passages 126 included through the deflector wall 114 may be dependent upon a desired pressure drop to be obtained across the dome-deflector member 108. In addition, the deflector wall cooling passages 126 may be arranged in any one of a number of patterns, depending on a desired flow of the air 82(*a*) to be provided through the deflector wall cooling passages 126 to the combustion chamber side 130 of the deflector wall 114. For example, the deflector wall cooling passages 126 may be arranged in a plurality of circumferential rows about the swirler assembly opening 110, with each circumferential row being arranged at a different radial distance from the swirler assembly opening 110. Alternatively, the deflector wall cooling passages 126 may be arranged to provide a desired swirl to the flow of air 82(*a*)

from the deflector cooling passages 126. The dome wall cooling passages 124, on the other hand, may be randomly spaced around the swirler assembly opening 110 through the dome wall 112, and the number and the size of the dome wall cooling passages 124 may also be dependent upon a desired pressure drop to be obtained across the dome-deflector member 108.

Referring again to FIGS. 4 and 5, various parameters of the integrated dome-deflector member 108 will be discussed. The various parameters relate to obtaining a desired pressure drop ($\Delta P$) across the integrated dome-deflector member 108 from the pressure plenum 66 side to the combustion chamber 62 side of the dome-deflector member 108, and to obtaining a cooling effectiveness factor (CE) at the combustion chamber side 130 of the deflector wall 114. Referring to FIG. 5, an area (A1) of the cross section of the integrated dome-deflector member 108 may be defined as a length (L1) 121 of the integrated dome-deflector member 108 and a width (W1) 123 of the dome-deflector member, where A1=L1×W1. Similarly, an area (A2) of the cavity 118 may be defined by a length (L2) 119 of the cavity and a width (W2) 117 of the cavity 118, where A2=L2×W2. For the dome-deflector member 108, a ratio (A2/A1) of the area A2 to the area A1 may have a range from two-tenths (0.2) to ninety-eight one-hundredths (0.98). In addition, a ratio of the total area (Ah1) of the dome wall cooling passages 124 through the dome wall 113 to a total area (Ah2) of the deflector wall cooling passages 126 through the deflector wall 114 is defined as Ah1/Ah2, and may have a range from one (1.0) to two (2.0). When each of the dome wall cooling passages 124 and the deflector wall cooling passages 126 is circular-shaped holes, the area of each dome wall cooling passage 124 and the area of each deflector wall cooling passage 126 is defined by $A=\pi r^2$. The total area (Ah1) of the dome wall cooling passages 124 is the sum of the area A of each dome wall cooling passage 124, and the total area (Ah2) of the deflector wall cooling passages 126 is the sum of the area A of each deflector wall cooling passage 126. The foregoing parameters (i.e., the ratios A2/A1 and Ah1/Ah2) may result in a desired pressure drop ($\Delta P$) across the dome-deflector member 108 of between one and one-half percent (1.5%) to three and one-half percent (3.5%). A cooling effectiveness factor (CE) may be defined as CE=$\Delta P$×(A2/A1)×(Ah1/Ah2), and, with the foregoing parameters, the cooling effectiveness factor (CE) may have a range from three-tenths percent (0.3%) to seven percent (7%).

Figure 7:
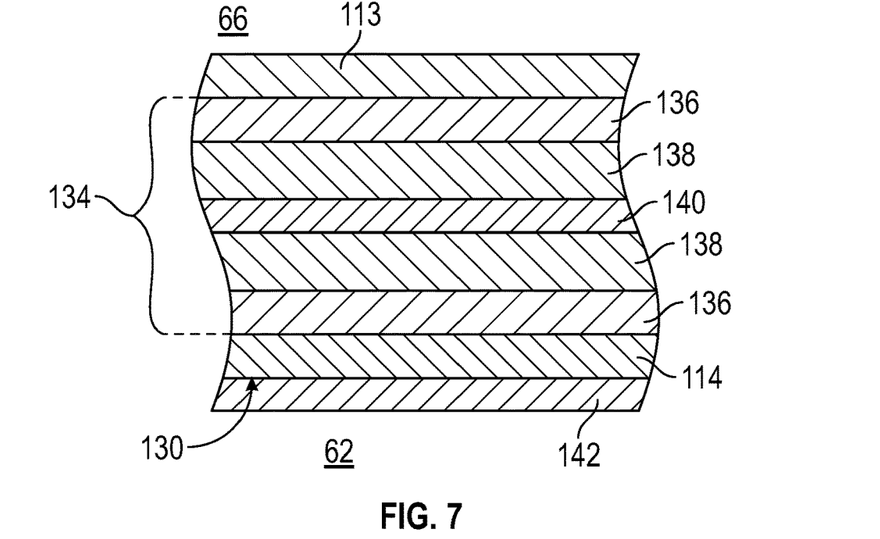
FIG. 7 is a partial cross-sectional view, taken at detail view 132 of FIG. 5, of a cavity with a buffer material layer, according to an aspect of the present disclosure.

In FIGS. 5 and 6, the cavity 118 is shown to be a hollow cavity. However, as shown in FIG. 7, which is a cross-sectional view taken at detail 132 of FIG. 5, the cavity 118 may be filled with at least one buffer material layer formed as a sandwiched structure 134. For example, as shown in FIG. 7, the cavity 118 may include a sandwiched structure 134 of at least one buffer material layer that may include, for example, a honeycomb material layer 136, a metal or a composite lattice structure layer 138, which may be formed of metal or composite material, and a sponge layer 140. In addition, depending on the material utilized, a thermal coating layer 142 may be added to an exterior of the integrated dome-deflector member 108, particularly, on a combustion chamber side 130 of the deflector wall 114, and to the inner wall 122 and the outer wall 120.

Figure 8:
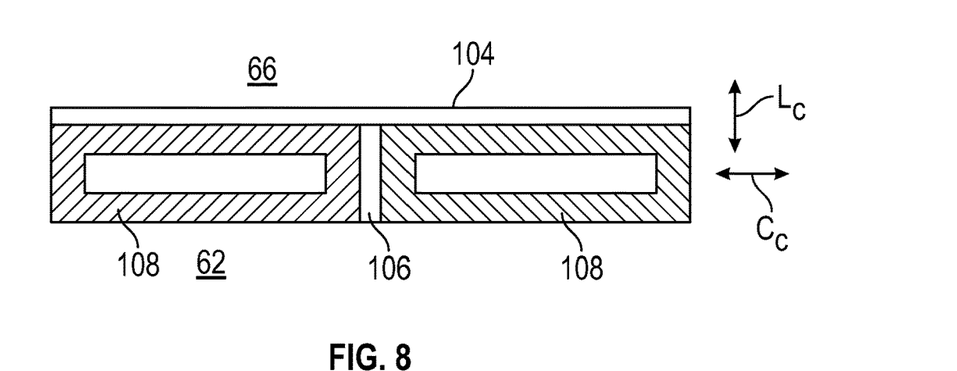
FIG. 8 is a sectional view, taken at circumferential cut-plane 8-8 in FIG. 3, depicting a circumferential arrangement between adjoining dome-deflector members, according to an aspect of the present disclosure.

FIG. 8 is a sectional view, taken at circumferential cut-plane 8-8 in FIG. 3, depicting a circumferential arrangement between adjoining dome-deflector members 108, according to an aspect of the present disclosure. As was discussed above, when the rib members 106 are included as part of the frame structure 100, adjoining ones of the plurality of dome-deflector members 108 may be connected to, or may abut against, the rib members 106.

Figure 9:
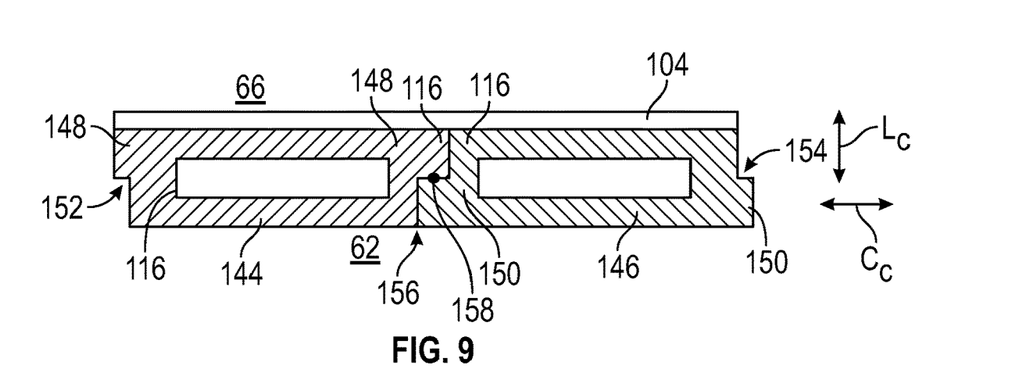
FIG. 9 is a sectional view, taken at circumferential cut-plane 8-8 in FIG. 3, depicting a circumferential arrangement between adjoining dome-deflector members, according to another aspect of the present disclosure.

FIG. 9 is a sectional view, taken at circumferential cut-plane 8-8 in FIG. 3, depicting a circumferential arrangement between adjoining dome-deflector members 108, according to another aspect of the present disclosure. When the rib members 106 are omitted from the frame structure 100, the side walls 116 of each respective integrated dome-deflector member 108 are configured to engage with the side walls 116 of another adjoining respective one of the plurality of integrated dome-deflector members 108 so as to form a seal between the respective adjoining ones of the plurality of integrated dome-deflector members 108. For example, as shown in FIG. 9, the plurality of integrated dome-deflector members 108 may include a first type of dome-deflector member 144 and a second type of dome-deflector member 146. The first type of dome-deflector member 144 includes a first side wall structure 148, and the second type of dome-deflector member 146 includes a second side wall structure 150. The first side wall structure 148 may include a first rabbet 152 and the second side wall structure 150 may include a second rabbet 154. As shown in FIG. 9, the first rabbet 152 may extend circumferentially outward from a dome wall side of the first side wall structure 148, and the second rabbet 154 may extend circumferentially outward from a deflector wall side of the second side wall structure 150. When the first type of dome-deflector member 144 and the second type of dome-deflector member 146 are joined together at a joint 156, the first side wall structure 148 of the first type of dome-deflector member 144 and the second side wall structure 150 of the second type of dome-deflector member 146 are joined with one another and fit together to form a seal therebetween. More specifically, the first rabbet 152 of the first type of dome-deflector member 144 overlaps circumferentially with the second rabbet 154 of the second type of dome-deflector member 146 so as to form the joint 156. A joint seal 158 may also be provided within the joint 156. Of course, other structures besides the first rabbet 152 and the second rabbet 154 could be implemented instead for the first side wall structure 148 and the second side wall structure 150, such as a tongue structure for the first side wall structure 148 and a groove structure for the second side wall structure 150 for implementing a tongue and groove joint structure, or a concave structure for the first side wall structure 148 that meshes with a convex structure for the second side wall structure 150. The first side wall structure 148 and the second side wall structure 150 may also be made of a flexible material so as to provide for a better seal between them. Thus, as shown in FIG. 3, when the rib members 106 are omitted, the first type of dome-deflector member 144 and the second type of dome-deflector member 146 are mounted to the frame structure 100 in an alternating arrangement circumferentially about the combustor axial centerline 112.

Figure 10:
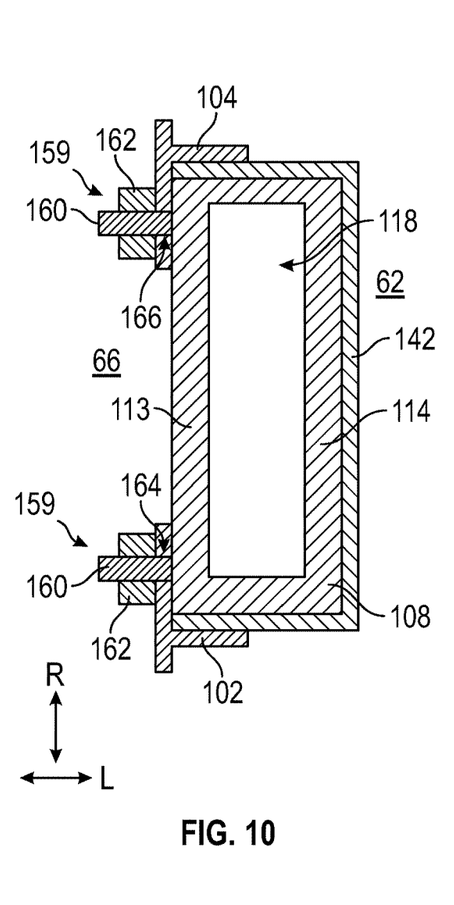
FIG. 10 is a partial cross-sectional view, taken at plane A-A of FIG. 3, depicting a dome-deflector member attachment to a frame structure, according to an aspect of the present disclosure.

FIGS. 10 to 15, each of which is a partial cross-sectional views taken at plane A-A of FIG. 3, depict various attachments of the integrated dome-deflector member 108 to the inner frame member 102 and the outer frame member 104. In each aspect, the dome wall 113 is connected to the inner frame member 102 and to the outer frame member 104. In FIG. 10, the integrated dome-deflector member 108 is connected to inner frame structure 102 and to the outer frame structure 104 via bolted joints 159. The integrated dome-deflector member 108 includes threaded studs 160 that may be integrated into the dome wall 113, and that protrude upstream from the dome wall 113. The integrated dome-deflector member 108 may be attached to the inner frame member 102 and the outer frame member 104 by the threaded studs 160 extending through holes 164 in the inner frame member 102 and through holes 166 in the outer frame member 104 and, then, being fastened to the inner frame member 102 and to the outer frame member 104 via nuts 162.

Figure 11:
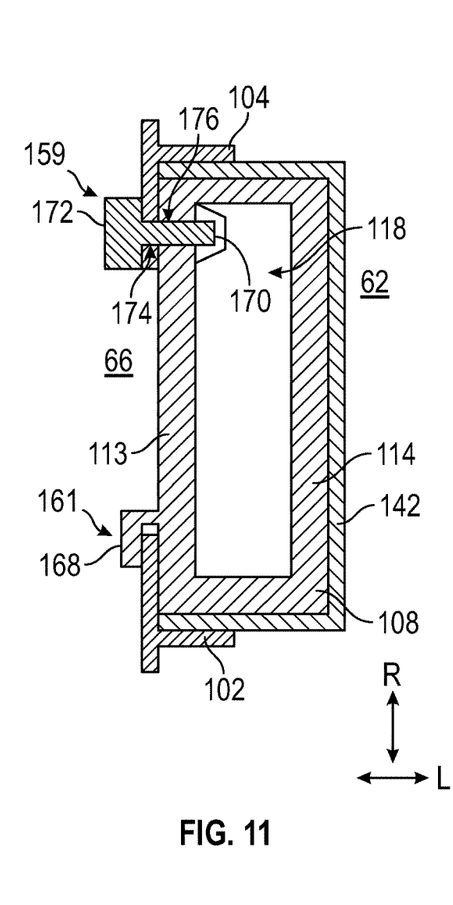
FIG. 11 is a partial cross-sectional view, taken at plane A-A of FIG. 3, depicting a dome-deflector member attachment to a frame structure, according to another aspect of the present disclosure.

In another aspect shown in FIG. 11, the integrated dome-deflector member 108 may be connected to the inner frame member 102 via a tongue and groove joint 161 and connected to the outer frame member 104 via a bolted joint 159. The dome wall 113 may include an L-shaped flange 168 extending upstream from the dome wall 113 and extending inward in the radial direction (R). The L-shaped flange 168 attaches the integrated dome-deflector member 108 to the inner frame member 102. The dome wall 113 includes a threaded insert 170 for attaching the integrated dome-deflector member 108 to the outer frame member 104. The L-shaped flange 168 may be engaged with the inner frame member 102 with a sliding engagement, such as in a tongue and groove type joint, and a fastener such as a bolt 172 may then be inserted through a hole 174 in the outer frame member 104 and through a hole 176 in the dome wall 113 so as to threadedly engage the insert 170. The dome-deflector member 108 is thus mounted to the inner frame member 102 and to the outer frame member 104.

Figure 12:
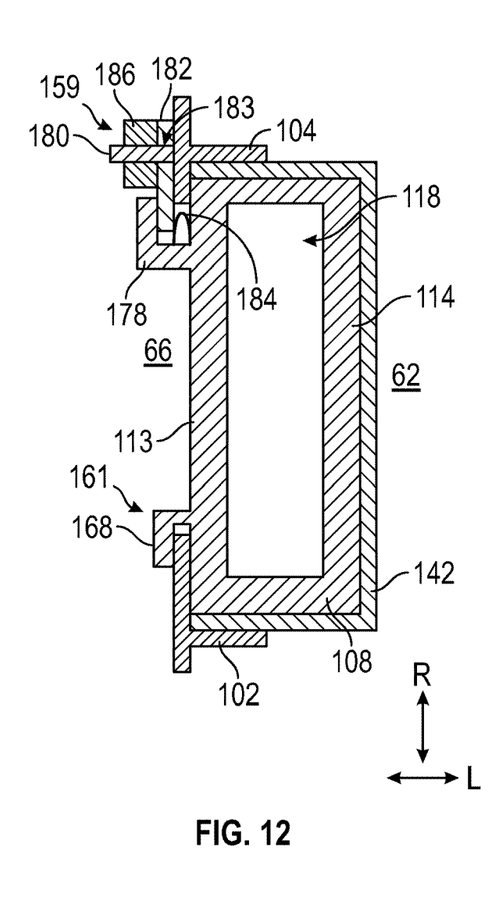
FIG. 12 is a partial cross-sectional view, taken at plane A-A of FIG. 3, depicting a dome-deflector member attachment to a frame structure, according to still another aspect of the present disclosure.

FIG. 12 also includes a bolted joint 159 connecting the integrated dome-deflector member 108 to the outer frame member 104 and a tongue and groove joint 161 connecting the integrated dome-deflector member 108 to the inner frame 102. The L-shaped flange 168 slidingly engages with the inner frame member 102. The integrated dome-deflector member 108 of FIG. 12 also includes an L-shaped flange 178 protruding upstream from the dome wall 113 and extending outward in the radial direction (R). The L-shaped flange 178 is for connecting the integrated dome-deflector member 108 to the outer frame member 104. In the FIG. 12 aspect, the outer frame member 104 includes a threaded stud 180 protruding upstream therefrom towards the pressure plenum 66. A retainer plate 182 is installed over the threaded stud 180 via a hole 183 in the retainer plate 182 and engages with the L-shaped flange 178. A spring clip 184 may be provided in a gap between the retainer plate 182 and the dome wall 113. A nut 186 threadedly engages the threaded stud 180 so as to complete the connection of the integrated dome-deflector member 108 to the inner frame member 102 and to the outer frame member 104.

Figure 13:
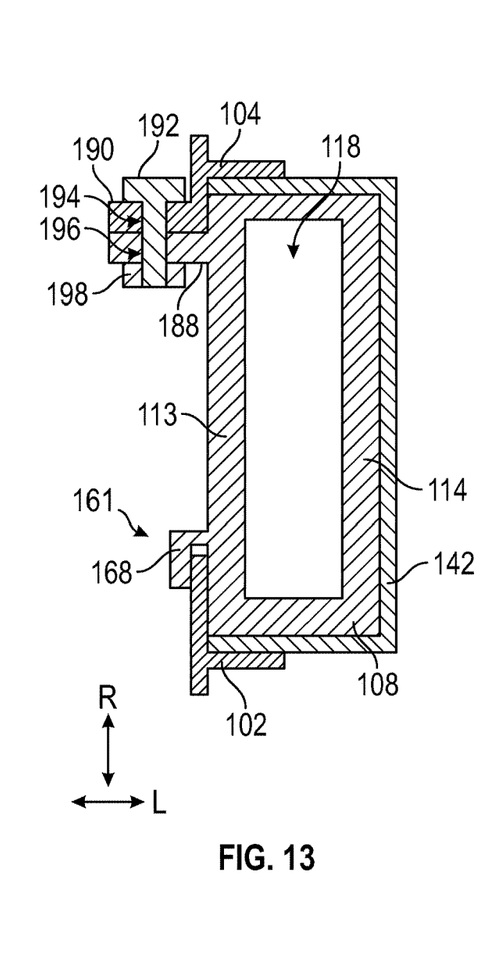
FIG. 13 is a partial cross-sectional view, taken at plane A-A of FIG. 3, depicting a dome-deflector member attachment to a frame structure, according to yet another aspect of the present disclosure.

FIG. 13 depicts a connection of the integrated dome-deflector member 108 to the inner frame member 102 via a tongue and groove joint 161 and to the outer frame member 104 via a bolted joint 159 according to still another aspect of the present disclosure. The FIG. 13 aspect includes the L-shaped flange 168 that slidingly engages with the inner frame member 102. The integrated dome-deflector member 108 includes a longitudinal flange 188 protruding upstream from the dome wall 113 and extending in the longitudinal direction (L). The outer frame member 104 also includes a longitudinal flange 190 extending upstream in the longitudinal direction (L). The longitudinal flange 188 and the longitudinal flange 190 engage with one another, and a fastener, such as a bolt 192, is inserted through a hole 194 of the longitudinal flange 190 of the outer frame member 104 and through the longitudinal flange 188 of the integrated dome-deflector member 108. A nut 198 is then threadedly engaged with the bolt 192 to complete the connection of the integrated dome-deflector member 108 to the inner frame member 102 and to the outer frame member 104.

Figure 14:
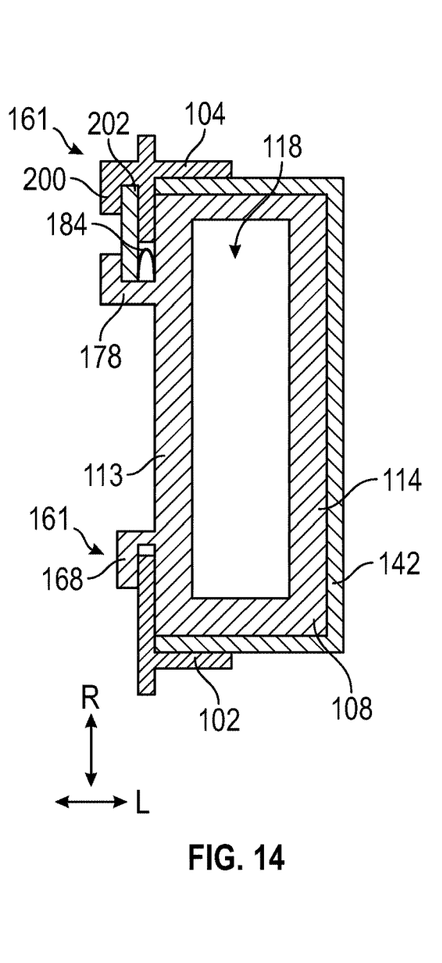
FIG. 14 is a partial cross-sectional view, taken at plane A-A of FIG. 3, depicting a dome-deflector member attachment to a frame structure, according to still yet aspect of the present disclosure.

FIG. 14 depicts a connection of the integrated dome-deflector member 108 to the inner frame member 102 via the tongue and groove joint 161 and to the outer frame member 104 via a tongue and groove joint 161 according to yet another aspect of the present disclosure. The FIG. 14 aspect includes the L-shaped flange 168 and the L-shaped flange 178. The outer frame member 104 includes an L-shaped flange 200 protruding upstream therefrom in the longitudinal direction (L) and extending inward in the radial direction (R). A retainer plate 202 may be inserted between the L-shaped flange 178 of the integrated dome-deflector member 108 and the L-shaped flange 200 of the outer frame member 104, and the spring clip 184 may be inserted in a gap between the retainer plate 202 and the dome wall 113. The integrated dome-deflector member 108 is, therefore, connected with the inner frame member 102 and the outer frame member 104.

Figure 15:
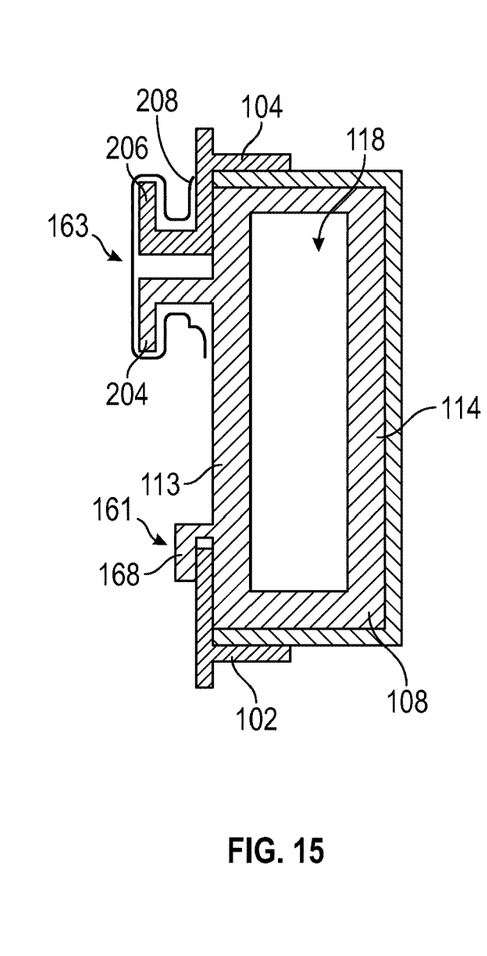
FIG. 15 is a partial cross-sectional view, taken at plane A-A of FIG. 3, depicting a dome-deflector member attachment to a frame structure, according to another aspect of the present disclosure.

FIG. 15 depicts a connection of the integrated dome-deflector member 108 to the inner frame member 102 via the tongue and groove joint 161 and to the outer frame member 104 via a retention clip joint 163 according to still yet another aspect of the present disclosure. The FIG. 15 aspect includes the L-shaped flange 168 slidingly engaged with the inner frame member 102. An L-shaped flange 204 protrudes upstream from the dome wall 113 and extends inward in the radial direction (R). The outer frame member 104 includes an L-shaped flange 206 protruding upstream therefrom and extending outward in the radial direction (R). A spring retention clip 208 engages with the L-shaped flange 206 of the outer frame member 104 and with the L-shaped flange 204 of the dome wall 113 so as to connect the integrated dome-deflector member 108 to the inner frame member 102 and to the outer frame member 104.

With each of the foregoing arrangements, the integrated dome-deflector member 108 can be mounted to the frame structure individually in any number of a variety of ways so as to readily be able to replace the dome-deflector member 108, if necessary. In addition, each integrated dome deflector member 108 can be individually manufactured separate from the dome frame structure 100, and can then be readily mounted to the frame structure 100. The individual integrated dome-deflector members 108 reduce the need for separately mounting a dome member and a deflector panel to the frame structure 100. Further, with the integrated dome-deflector member 108 of the present disclosure, materials such as ceramic matrix composites (CMC) can be utilized in manufacturing the integrated dome-deflector member 108, with the CMC integrated dome-deflector member 108 being able to be readily attached to the frame structure 100, which may be made of metallic materials. The CMC integrated dome-deflector member 108 can provide better durability of the dome-deflector structure, thereby requiring less frequent replacement.

While the foregoing description relates generally to a gas turbine engine, it can readily be understood that the gas turbine engine may be implemented in various environments. For example, the engine may be implemented in an aircraft, but may also be implemented in non-aircraft applications, such as power generating stations, marine applications, or oil and gas production applications. Thus, the present disclosure is not limited to use in aircraft.

Further aspects of the present disclosure are provided by the subject matter of the following clauses.

A dome structure for a combustor of a gas turbine, the dome structure including a frame structure extending circumferentially about a combustor centerline axis, and a plurality of integrated dome-deflector members mounted to the frame structure, each integrated dome-deflector member of the plurality of integrated dome-deflector members including a dome wall, a deflector wall, and a plurality of side walls connecting the dome wall and the deflector wall to each other, a cavity being defined by the dome wall, the deflector wall, and the plurality of side walls.

The dome structure according to the preceding clause, wherein at least one buffer material layer is provided within the cavity, the at least one buffer material layer including any of a honeycomb layer, a lattice layer, and a sponge layer.

The dome structure according to any preceding clause, wherein the frame structure includes an inner frame member extending circumferentially about the combustor centerline axis, and an outer frame member extending circumferentially about the combustor centerline axis, the outer frame member being arranged radially outward of the inner frame member.

The dome structure according to any preceding clause, wherein the frame structure further includes a plurality of rib members circumferentially spaced apart about the combustor centerline axis and connecting the inner frame member and the outer frame member, respective ones of the plurality of integrated dome-deflector members being arranged between successive pairs of the plurality of rib members.

The dome structure according to any preceding clause, wherein each integrated dome-deflector member includes a swirler assembly opening extending through the dome wall and extending through the deflector wall.

The dome structure according to any preceding clause, wherein the dome wall includes a plurality of dome wall cooling passages therethrough, the plurality of dome wall cooling passages being arranged to provide a flow of cooling air therethrough to the cavity.

The dome structure according to any preceding clause, wherein the deflector wall includes a plurality of deflector wall cooling passages therethrough, the plurality of deflector wall cooling passages being arranged to provide a flow of cooling air therethrough from the cavity to a combustion chamber side of the deflector wall.

The dome structure according to any preceding clause, wherein the plurality of deflector wall cooling passages are arranged at an angle through the deflector wall.

The dome structure according to any preceding clause, wherein a ratio of an area (Ah1) of the dome wall cooling passages to an area (Ah2) of the deflector wall cooling passages is: Ah1/Ah2=one to two.

The dome structure according to any preceding clause, wherein a pressure drop ($\Delta P$) across each integrated dome-deflector member has a range of one and one-half percent to three and one-half percent.

The dome structure according to any preceding clause, wherein a ratio of a cross-sectional area (A1) of each dome-deflector member to a cross-sectional area (A2) of the cavity has a range from two-tenths to ninety-eight one-hundredths.

The dome structure according to any preceding clause, wherein a cooling effectiveness factor (CE) of each dome-deflector member, where CE=$\Delta P$*A2/A1*(Ah1/Ah2), has a range from three-tenths of one percent to seven percent.

The dome structure according to any preceding clause, wherein the plurality of integrated dome-deflector members are mounted in a circumferential arrangement about the combustor centerline axis between the inner frame member and the outer frame member.

The dome structure according to any preceding clause, wherein each side wall of the plurality of side walls is configured to engage with a side wall of another adjoining integrated dome-deflector member so as to form a seal between respective adjoining ones of the plurality of integrated dome-deflector members.

The dome structure according to any preceding clause, wherein the plurality of integrated dome-deflector members includes a first type of integrated dome-deflector members among the plurality of integrated dome-deflector members, and a second type of integrated dome-deflector members among the plurality of integrated dome-deflector members, each integrated dome-deflector member of the first type of integrated dome-deflector members including a first side wall type, and each integrated dome-deflector member of the second type of integrated dome-deflector members including a second side wall type, the plurality of integrated dome-deflector members being mounted to the frame structure in an alternating arrangement circumferentially with a first type of integrated dome-deflector member and a second type of integrated dome-deflector member.

The dome structure according to any preceding clause, wherein the first side wall type is configured to overlap with the second side wall type.

The dome structure according to any preceding clause, wherein the dome wall engages with the frame structure, and each integrated dome-deflector member is mounted to the frame structure via at least one of a bolted joint, a tongue and groove joint, and a retention clip joint.

The dome structure according to any preceding clause, wherein the dome wall and the deflector wall are constructed of at least one of a metal alloy and a ceramic matrix composite.

The dome structure according to any preceding clause, wherein the deflector wall includes a thermal coating layer provided on a side of the deflector wall opposite the cavity.

The dome structure according to any preceding clause, wherein each dome-deflector member includes an outer wall and an inner wall, the outer wall and the inner wall extending circumferentially between the plurality of side walls and extending in a longitudinal direction between the dome wall and the deflector wall, the dome-deflector member defining a hollow box structure.

A dome structure for a combustor of a gas turbine, the dome structure including a mounting structure extending circumferentially about a centerline axis of the combustor, and a plurality of integrated dome-deflector units for being mounted to the mounting structure, each integrated dome-deflector unit of the plurality of integrated dome-deflector units including a plurality of walls defining a hollow box-like structure with a cavity being defined therewithin.

The dome structure according to the preceding clause, wherein at least one buffer material is provided within the cavity, the at least one buffer material including any of a honeycomb, a lattice, and a sponge.

The dome structure according to any preceding clause, wherein the mounting structure includes an inner frame unit extending circumferentially about the combustor centerline axis, and an outer frame unit extending circumferentially about the combustor centerline axis, the outer frame being arranged radially outward of the inner frame.

The dome structure according to any preceding clause, wherein the mounting structure further includes a plurality of rib units circumferentially spaced apart about the combustor centerline axis and connecting the inner frame unit and the outer frame unit, respective ones of the plurality of integrated dome-deflector members being arranged between successive pairs of the plurality of rib members.

The dome structure according to any preceding clause, wherein each integrated dome-deflector member unit has a swirler assembly opening extending through a first wall and extending through a second wall.

The dome structure according to any preceding clause, wherein the first wall includes a plurality of first wall cooling passages therethrough, the plurality of first wall cooling passages being arranged to provide a flow of cooling air therethrough to the cavity.

The dome structure according to any preceding clause, wherein the second wall includes a plurality of second wall cooling passages therethrough, the plurality of second wall cooling passages being arranged to provide a flow of cooling air therethrough from the cavity to a combustion chamber side of the second wall.

The dome structure according to any preceding clause, wherein the plurality of second wall cooling passages are arranged at an angle through the second wall.

The dome structure according to any preceding clause, wherein a ratio of an area (Ah1) of the first wall cooling passages to an area (Ah2) of the second wall cooling passages is: Ah1/Ah2=one to two.

The dome structure according to any preceding clause, wherein a pressure drop ($\Delta P$) across each integrated dome-deflector unit has a range of one and one-half percent to three and one-half percent.

The dome structure according to any preceding clause, wherein a ratio of a cross-sectional area (A1) of each dome-deflector unit to a cross-sectional area (A2) of the cavity has a range from two-tenths to ninety-eight one-hundredths.

The dome structure according to any preceding clause, wherein a cooling effectiveness factor (CE) of each dome-deflector unit, where $CE=\Delta P*A2/A1*(Ah1/Ah2)$, has a range from three-tenths of one percent to seven percent.

The dome structure according to any preceding clause, wherein the plurality of integrated dome-deflector units are mounted in a circumferential arrangement about the combustor centerline axis between the inner frame unit and the outer frame unit.

The dome structure according to any preceding clause, wherein the integrated dome-deflector unit further includes a plurality of third walls connecting the first wall and the second wall, and each third wall of the plurality of third walls is configured to engage with a third wall of another adjoining integrated dome-deflector unit so as to form a seal between respective adjoining ones of the plurality of integrated dome-deflector units.

The dome structure according to any preceding clause, wherein the plurality of integrated dome-deflector units includes a first type of integrated dome-deflector unit among the plurality of integrated dome-deflector units, and a second type of integrated dome-deflector unit among the plurality of integrated dome-deflector units, each integrated dome-deflector unit of the first type of integrated dome-deflector unit including a first third wall type, and each integrated dome-deflector unit of the second type of integrated dome-deflector unit including a second third wall type, the plurality of integrated dome-deflector units being mounted to the mounting structure in an alternating arrangement circumferentially with a first type of integrated dome-deflector unit and a second type of integrated dome-deflector unit.

The dome structure according to any preceding clause, wherein the first third wall type is configured to overlap with the second third wall type.

The dome structure according to any preceding clause, wherein the first wall engages with the mounting structure, and each integrated dome-deflector unit is mounted to the mounting structure via at least connecting means.

The dome structure according to any preceding clause, wherein the first wall and the second wall are constructed of at least one of a metal alloy and a ceramic matrix composite.

The dome structure according to any preceding clause, wherein the second wall includes a thermal coating layer provided on a side of the second wall opposite the cavity.

Although the foregoing description is directed to some exemplary embodiments of the present disclosure, other variations and modifications will be apparent to those skilled in the art and may be made without departing from the spirit or scope of the disclosure. Moreover, features described in connection with one embodiment of the present disclosure may be used in conjunction with other embodiments, even if not explicitly stated above.

We claim:

1. A combustor of a gas turbine, the combustor comprising:
a combustor liner including an inner liner and an outer liner, the inner liner and the outer liner extending circumferentially about a combustor centerline axis; and
a dome structure, the dome structure including (a) a metallic frame structure extending circumferentially about the combustor centerline axis, the metallic frame structure being connected to the inner liner and to the outer liner, and (b) a plurality of integrated ceramic matrix composite (CMC) dome-deflector members mounted to the metallic frame structure, each integrated CMC dome-deflector member of the plurality of integrated CMC dome-deflector members including a CMC dome wall, a CMC deflector wall, and a plurality of CMC side walls connecting the CMC dome wall and the CMC deflector wall to each other, a cavity being defined by the CMC dome wall, the CMC deflector wall, and the plurality of CMC side walls,
wherein the plurality of integrated CMC dome-deflector members includes a first CMC integrated dome-deflector member and a second CMC integrated dome-deflector member circumferentially arranged adjacent to the first CMC integrated dome-deflector member,
wherein the plurality of CMC side walls of the first CMC integrated dome-deflector member include a first side wall structure, and the plurality of CMC side walls of the second integrated CMC dome-deflector member include a second side wall structure different from the first side wall structure, the first side wall structure and the second side wall structure forming a joint therebetween such that at least a portion of the first side wall structure and a portion of the second side wall structure circumferentially overlap with each other.

2. The combustor according to claim 1, wherein at least one buffer material layer is provided within the cavity, the at least one buffer material layer including any of a honeycomb layer, a lattice layer, and a sponge layer.

3. The combustor according to claim 1, wherein the metallic frame structure includes a metallic inner frame member extending circumferentially about the combustor centerline axis and connected with the inner liner, and a metallic outer frame member extending circumferentially about the combustor centerline axis and connected with the outer liner, the metallic outer frame member being arranged radially outward of the metallic inner frame member.

4. The combustor according to claim 3, wherein the metallic frame structure further includes a plurality of rib members circumferentially spaced apart about the combustor centerline axis and connecting the metallic inner frame member and the metallic outer frame member, respective ones of the plurality of integrated CMC dome-deflector members being arranged between successive pairs of the plurality of rib members.

5. The combustor according to claim 1, wherein each integrated CMC dome-deflector member includes a swirler assembly opening extending through the CMC dome wall and extending through the CMC deflector wall, and the combustor further includes a swirler assembly mounted in the combustor and extending through the swirler assembly opening.

6. The combustor according to claim 1, wherein the CMC dome wall includes a plurality of dome wall cooling passages therethrough, the plurality of dome wall cooling passages being arranged to provide a flow of cooling air therethrough to the cavity.

7. The combustor according to claim 6, wherein the CMC deflector wall includes a plurality of deflector wall cooling passages therethrough, the plurality of deflector wall cooling passages being arranged to provide a flow of cooling air therethrough from the cavity to a combustion chamber side of the CMC deflector wall.

8. The combustor according to claim 7, wherein the plurality of deflector wall cooling passages are arranged at an angle through the CMC deflector wall.

9. The combustor according to claim 7, wherein a ratio (Ah1/Ah2) of an area (Ah1) of the dome wall cooling passages to an area (Ah2) of the deflector wall cooling passages is in a range from one to two.

10. The combustor according to claim 9, wherein a ratio (A2/A1) of a cross-sectional area (A2) of the cavity to a cross-sectional area (A1) of each integrated CMC dome-deflector member has a range from two-tenths to ninety-eight one-hundredths.

11. The combustor according to claim 10, wherein, in operation of the combustor in which a pressurized airflow is provided to the combustor, the ratio Ah1/Ah2 and the ratio A2/A1 provide for a pressure drop ($\Delta P$) across each integrated CMC dome-deflector member, where $\Delta P$ has a range of one and one-half percent to three and one-half percent.

12. The combustor according to claim 11, wherein a cooling effectiveness factor (CE) of each integrated CMC dome-deflector member, where $CE=\Delta P*A2/A1*(Ah1/Ah2)$, has a range from three-tenths of one percent to seven percent.

13. The combustor according to claim 3, wherein the plurality of integrated CMC dome-deflector members are mounted in a circumferential arrangement about the combustor centerline axis between the metallic inner frame member and the metallic outer frame member.

14. The combustor according to claim 1, wherein a seal is provided between the first side wall structure of the first integrated CMC dome-deflector member and the second side wall structure of the second integrated CMC dome-deflector member.

15. The combustor according to claim 1, wherein the first side wall structure includes any one of a first rabbet structure, a tongue structure, or a concave wall structure, and the second side wall structure includes any one of a second rabbet structure, a groove structure, or a convex wall structure.

16. The combustor according to claim 3, wherein at least one of the plurality of integrated CMC dome-deflector members is mounted to one of the metallic inner frame member or the metallic outer frame member via a bolted joint, and is mounted to the other of the metallic inner frame member or the metallic outer frame member via an L-shaped flange extending from an upstream side of the CMC dome wall, the L-shaped flange forming a tongue and groove joint with the metallic inner frame member.

17. The combustor according to claim 1, wherein the CMC dome wall engages with the metallic frame structure, and each integrated CMC dome-deflector member is mounted to the metallic frame structure via at least one of a bolted joint, a tongue and groove joint, or a retention clip joint.

18. The combustor according to claim 3, wherein the CMC dome wall includes a first L-shaped flange on an upstream side of the CMC dome wall and a second L-shaped flange on the upstream side of the CMC dome wall, the first L-shaped flange defining a groove that engages with the metallic inner frame member to connect the CMC dome wall to the metallic inner frame member, and the second L-shaped flange connecting the CMC dome wall to the metallic outer frame member.

19. The combustor according to claim 1, wherein the CMC deflector wall includes a thermal coating layer provided on a side of the CMC deflector wall opposite the cavity.

20. The combustor according to claim 1, wherein at least one of the plurality of integrated CMC dome-deflector members includes at least one of a CMC outer wall and a CMC inner wall, the CMC outer wall and the CMC inner wall extending circumferentially between the plurality of CMC side walls and extending in a longitudinal direction between the CMC dome wall and the CMC deflector wall, the at least one of the plurality of integrated CMC dome-deflector members defining a hollow box structure.

\* \* \* \* \*